United States Patent
Ayabe et al.

(10) Patent No.: US 7,374,512 B2
(45) Date of Patent: May 20, 2008

(54) SHIFT CONTROL APPARATUS FOR AUTOMATIC TRANSMISSION

(75) Inventors: Atsushi Ayabe, Nagoya (JP); Toshio Sugimura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 252 days.

(21) Appl. No.: 11/268,588

(22) Filed: Nov. 8, 2005

(65) Prior Publication Data

US 2006/0154780 A1    Jul. 13, 2006

(30) Foreign Application Priority Data

Nov. 10, 2004    (JP)    ............... 2004-325958

(51) Int. Cl.
  *F16H 59/20*    (2006.01)
(52) U.S. Cl. .............. 477/133; 477/136; 477/141
(58) Field of Classification Search .......... 477/79, 477/80, 133, 136, 141
  See application file for complete search history.

(56) References Cited

U.S. PATENT DOCUMENTS

| | | | |
|---|---|---|---|
| 5,203,234 A | | 4/1993 | Asada et al. |
| 5,233,525 A | * | 8/1993 | Overmann et al. ........... 701/55 |
| 6,113,516 A | * | 9/2000 | Janecke ...................... 477/124 |
| 6,851,328 B2 | * | 2/2005 | Umemoto et al. ............ 74/335 |
| 2002/0046617 A1 | | 4/2002 | Inagawa et al. |

FOREIGN PATENT DOCUMENTS

| | | |
|---|---|---|
| JP | 3-157559 | 7/1991 |
| JP | 5-99314 | 4/1993 |
| JP | 10-281277 | 10/1998 |
| JP | 2001-227635 | 8/2001 |
| JP | 2002-130454 | 5/2002 |
| JP | 2005-344773 | 12/2005 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

When it is decided that it is impossible to shift the automatic transmission directly to the target speed position according to the second shifting-action decision made during a shifting control to shift the automatic transmission to a target speed according to a first shifting-action decision, one of a plurality of candidate intermediate speed positions to which the automatic transmission can be shifted directly is determined as an intermediate speed position. The determined intermediate speed position is established with the largest amount of change of an engine speed NE, and accordingly with the longest time required for completion of the change of the engine speed NE during which a hydraulic pressure of a clutch to be engaged to establish the intermediate speed position can be raised, whereby the clutch engaging pressure can be changed at a rate low enough to reduce a shifting shock of the automatic transmission.

8 Claims, 12 Drawing Sheets

FIG.2

| SPEED POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

FIG.8

| | SHIFT PATTERNS | SHIFTING TIMES |
|---|---|---|
| No.1 | 5→4 SHIFTING | ⟵⟶ |
| No.2 | 4→3 SHIFTING | ⟵⟶ |
| No.3 | 3→2 SHIFTING | ⟵⟶ |
| No.4 | 2→1 SHIFTING | ⟵⟶ |
| No.5 | 4→2 SHIFTING | ⟵⟶ |
| No.6 | 3→1 SHIFTING | ⟵⟶ |
| No.7 | 5→4→3 TWO-STEP SHIFTING | ⟵⟶ |
| No.8 | 5→4→2 TWO-STEP SHIFTING | ⟵⟶ |
| No.9 | 4→3→2 TWO-STEP SHIFTING | ⟵⟶ |
| No.10 | 3→2→1 TWO-STEP SHIFTING | ⟵⟶ |

S7-1: DETERMINING ONE OF CANDIDATE INTERMEDIATE SPEED POSITIONS WHICH CAN BE ESTABLISHED IN THE SHORTEST TIME

S7-2 DETERMINING ONE OF CANDIDATE INTERMEDIATE SPEED POSITIONS WHICH IS ESTABLISHED WITH THE SMALLEST CHANGE OF ENGINE SPEED NE

SHIFT CONTROL APPARATUS FOR AUTOMATIC TRANSMISSION

FIELD OF THE INVENTION

The present invention relates in general to a shift control apparatus for a vehicular automatic transmission, and more particularly to a shift control apparatus for an automatic transmission, which provides an improvement in the control of a shifting action of the vehicular automatic transmission to a target speed position selected according to a second shifting-action decision that is made during a shifting control of the automatic transmission according to a first shifting-action decision.

BACKGROUND ART

In a shift control apparatus for controlling shifting actions of an automatic transmission which have a plurality of speed positions having respective different speed ratios and which are established by selectively engaging a plurality of frictional coupling devices, a second shifting-action decision to effect a shifting action of the automatic transmission to a given speed position may be made during a shifting control of the automatic transmission according to a first shifting-action decision to effect a shifting action to another speed position. This second shifting-action decision by the shift control apparatus takes place as a result of an operation by an operator of a vehicle such as an abrupt operation of an accelerator pedal or successive operations of a shift lever, or due to a change of a running state of the vehicle such as running on an uphill or slipping of the vehicle.

When the second shifting-action decision is made during the shifting control according to the first shifting-action decision, the shifting control according to the first shifting-action decision is stopped, and a shifting control to shift the automatic transmission to the target speed position selected according to the second shifting-action decision is immediately initiated. Patent Document 1 discloses an example of a shift control apparatus arranged to control the automatic transmission in such a manner. This shift control apparatus requires a shorter time for controlling the shifting actions of the automatic transmission, than a shift control apparatus arranged to initiate the shift control according to the second shifting-action decision after completion of the shifting control according to the first shifting-action decision.

However, there are cases where the shifting control according to the second shifting-action decision is not or cannot be initiated immediately after the second shifting-action decision made during the shifting control according to the first shifting-action decision. That is, the shifting control to shift the automatic transmission to the target speed position newly selected according to the second shifting-action decision cannot be initiated immediately after stopping of the shifting control according to the first shifting-action decision, if the number of the frictional coupling devices that should be concurrently controlled to establish the newly selected target speed position is larger than a predetermined upper limit number of the frictional coupling devices that can be concurrently controlled by the shift control apparatus.

For example, the shift control apparatus disclosed in the above-indicated Patent Document 1 is arranged to stop the first shifting control and immediately initiate the second shifting control if the second shifting-action decision is made before a moment of initiation of an actual engaging action of each frictional coupling device in the first shifting control, but continue the first shifting action and initiate the second shifting action after completion of the first shifting control if the second shifting-action decision is made after the above-indicated moment of initiation. If the second shifting control is initiated immediately after stopping of the first shifting control after the moment of initiation of the actual engaging action of the frictional coupling device in the first shifting control, this frictional coupling device whose engaging action has already been initiated must be released again, and another frictional coupling device must be engaged. In this case, therefore, it is difficult to control the shifting actions without a shifting shock.

[Patent Document 1]: JP-10-281277 A

Where the shifting control according to the second shifting-action decision cannot be initiated immediately after the moment of the second shifting-action decision during the shifting control according to the first shifting-action decision, as described above, the shift control apparatus disclosed in the above-identified Patent Document 1 is arranged to first establish the target speed position which is selected according to the first shifting-action decision and which is different from the target speed position selected according to the second shifting-action decision. Thus, the speed position to be once established before initiation of the shifting control according to the second shifting-action decision is fixed and kept unchanged, giving rise to a problem of insufficiency of the shifting control, such as insufficient reduction of the shifting shock and insufficient shortening of the required shifting time.

The present invention was made in view of the background art discussed above. It is therefore an object of the present invention to provide a shift control apparatus for an automatic transmission, which provides an improvement in the shifting control where it is impossible to effect the shifting control to shift the automatic transmission directly to the target speed position according to the second shifting-action decision.

DISCLOSURE OF THE INVENTION

The objected indicated above may be achieved according to a first aspect of the present invention, which provides a shift control apparatus for controlling an automatic transmission having a plurality of speed positions having respective different speed ratios and established by selectively engaging a plurality of frictional coupling devices, such that a shifting control to shift the automatic transmission to a target speed position according to a first shifting-action decision is switched to a shifting control to shift the automatic transmission to a target speed position according to a second shifting-action decision made during the shifting control according to the first shifting-action decision, the shift control apparatus being characterized by comprising shift control means operable, when it is impossible to shift the automatic transmission directly to the target speed position according to the second shifting-action decision, for determining, as an intermediate speed position of the automatic transmission, one of the speed positions to which the automatic transmission can be shifted directly at a moment of the second shifting-action decision, and effecting a shifting control to shift the automatic transmission to the target speed position according to the second shifting-action decision after establishing the intermediate speed position.

The shift control apparatus according to a second aspect of this invention which is a preferred form of the first aspect of the invention is characterized in that the shift control means determines, as the intermediate speed position, one of the speed positions of the automatic transmission that can be directly established at the moment of the second shifting-action decision, which one speed position is established with a largest amount of change of a speed of an engine.

The shift control apparatus according to a third aspect of this invention which is a preferred form of the first aspect of the invention is characterized in that the shift control means determines, as the intermediate speed position, one of the speed positions of the automatic transmission that can be directly established at the moment of the second shifting-action decision, which one speed position is established in a shortest time.

The shift control apparatus according to a fourth aspect of this invention which is a preferred form of the first aspect of the invention is characterized in that the shift control means determines, as the intermediate speed position, one of the speed positions of the automatic transmission that can be directly established at the moment of the second shifting-action decision, which one speed position is established with a smallest amount of change of a speed of an engine in a direction to establish the intermediate speed position.

The shift control apparatus according to a fifth aspect of this invention which is a preferred form of any one of the first through fourth aspects of the invention is characterized by further comprising shift-pattern memory means for storing a plurality of shift patterns of the automatic transmission and shifting times of the plurality of shift patterns, and selecting means, operable when there are a plurality of combinations of the shift patterns which permit a shifting action of the automatic transmission from the intermediate speed position to the target speed position according to the second shifting-action decision, for obtaining total shifting times of the plurality of combinations of the shift patterns on the basis of the shifting times stored in the shift-pattern memory means, and selecting one of the combinations the total shifting time of which is the shortest, and wherein the shift control means effects the shifting control to shift the automatic transmission from the intermediate speed position to the target speed position according to the combination of the shift patterns selected by the selecting means.

The shift control apparatus according to the first aspect of this invention is arranged such that when it is impossible to shift the automatic transmission directly to the target speed position according to the second shifting-action decision, one of the speed positions to which the automatic transmission can be shifted directly at a moment of the second shifting-action decision is determined as the intermediate speed position which provides the highest improvement in the shifting control of the automatic transmission. Accordingly, the present shift control apparatus provides an improvement in the shifting control of the automatic transmission over that of a shift control apparatus in which the intermediate speed position is fixed and kept unchanged.

The shift control apparatus according to the second aspect of the invention is arranged such that one of the speed positions of the automatic transmission which is established with the largest amount of change of the engine speed is determined as the intermediate speed position, so that a comparatively long time is required for the engine speed to have changed to a value determined by the intermediate speed position, whereby a hydraulic pressure of the frictional coupling device to be engaged to establish the intermediate speed position can be changed at a comparatively low rate, making it possible to reduce a shock due to an engaging action of the frictional coupling device, namely, to reduce a shifting shock of the automatic transmission upon a shifting action of the automatic transmission to the intermediate speed position, and improve the durability of the frictional coupling device.

The shift control apparatus according to the third aspect of the invention is arranged to rapidly shift the automatic transmission to the determined intermediate speed position, so that the time required to eventually establish the target speed position can also be reduced. The shift control apparatus according to the fourth aspect of the invention is also arranged to rapidly shift the automatic transmission to the intermediate speed position, so that the time required to eventually establish the target speed position can also be reduced.

The shift control apparatus according to the fifth aspect of the invention is arranged to eventually shift the automatic transmission from the intermediate speed position to the target speed position in the shortest time, so that the target speed position can be rapidly established.

In one preferred arrangement of the shift control apparatus, the target speed position according to the shifting-action decision is determined on the basis of actual values of a running speed of a vehicle and an operating amount $A_{CC}$ of an accelerator pedal of the vehicle, and according to shift boundary lines formulated to determine the target speed position on the basis of the vehicle running speed and the operating amount $A_{CC}$ of the accelerator pedal. In one form of this arrangement, the shift boundary lines are changed on the basis of a rate of change of the operating amount $A_{CC}$ of the accelerator pedal. Alternatively, the target speed position is determined so as to produce a required drive force or decelerating force of the vehicle determined according to a statistical data base which is obtained to determine the required vehicle drive force or decelerating force on the basis of the operating amount $A_{CC}$ of the accelerator pedal and the rate of change of this operating amount or an operating amount of a brake pedal. Various other arrangements to determine the target speed position are available.

It is impossible to shift the automatic transmission 14 directly to the target speed position according to the second shifting-action decision, where the number of the frictional coupling devices that should be concurrently controlled to effect the shifting control according to the second shifting-action decision after immediately stopping the shifting control according to the first shifting-action decision is larger than a predetermined upper limit number of the frictional coupling devices that can be concurrently controlled. For instance, it is usually possible to shift the automatic transmission by effecting a so-called "clutch to clutch" control of releasing one frictional coupling device while engaging another frictional coupling device, but is it not usually permitted to control a further frictional coupling device concurrently with those two frictional coupling devices, namely, to concurrently control three or more frictional coupling devices. However, any frictional coupling device which is in the process of a releasing or engaging action and which does not have an influence on a change of the engine speed NE is not taken into account when the number of the frictional coupling devices that should be concurrently controlled is compared with the upper limit number. That is, the decision as to whether it is possible to shift the automatic transmission directly to the target speed position is made on the basis of the number of the frictional coupling devices excluding the above-indicated frictional coupling device.

The intermediate speed position may be determined according to any one of the second through fourth aspects of this invention described above, alone or in combination. For example, the time required to establish the target speed position through the intermediate speed position provisionally determined according to the third aspect of the invention and the time required to establish the target speed position through the intermediate speed position provisionally determined according to the fourth aspect of the invention are compared with each other, and one of these two provisional intermediate speed positions which permits the automatic transmission to be more rapidly shifted to the target speed position is eventually determined as the intermediate speed position. Alternatively, the time required to complete the shifting action to the target speed position through the intermediate speed position provisionally determined according to the second aspect of the invention and the time required to complete the shifting action to the target speed position through the intermediate speed position provisionally determined according to the third or fourth aspect of the invention are compared with each other, and if the time required to complete the shifting action through the intermediate speed position provisionally determined according to the second aspect is not considerably longer than the time required to complete the shifting action through the intermediate speed position provisionally determined according to the third or fourth aspect, the intermediate speed position provisionally determined according to the second aspect is eventually determined as the intermediate speed position, for the purpose of reducing the shifting shock of the automatic transmission.

Any one of the shift patterns indicated above permits the shifting control of the automatic transmission without a shifting shock, and these shift patterns are suitably determined depending upon the specific configuration of the automatic transmission. The shift patterns may include one-step shift patterns each for effecting a shifting action of the automatic transmission to the speed position next to the present speed position, multiple-step shift patterns each for effecting successive shifting actions of the automatic transmission to two or more successive speed positions, jumping shift patterns each for effecting a shifting action of the automatic transmission to a speed position which is not the next speed position, and shift patterns each of which is a combination of any of the one-step shift patterns, any of the multiple-step patterns and any of the jumping shift patterns.

BRIEF DESCRIPTION OF THE DRAWINGS

FIG. 2 is a view indicating engaged and released states of clutches and brakes to establish speed positions of an automatic transmission shown in FIG. 1;

FIG. 8 is a view indicating an example of shift-pattern information stored in shift-pattern memory means shown in FIG. 7;

EXPLANATION OF REFERENCE SIGNS

Figure 1:
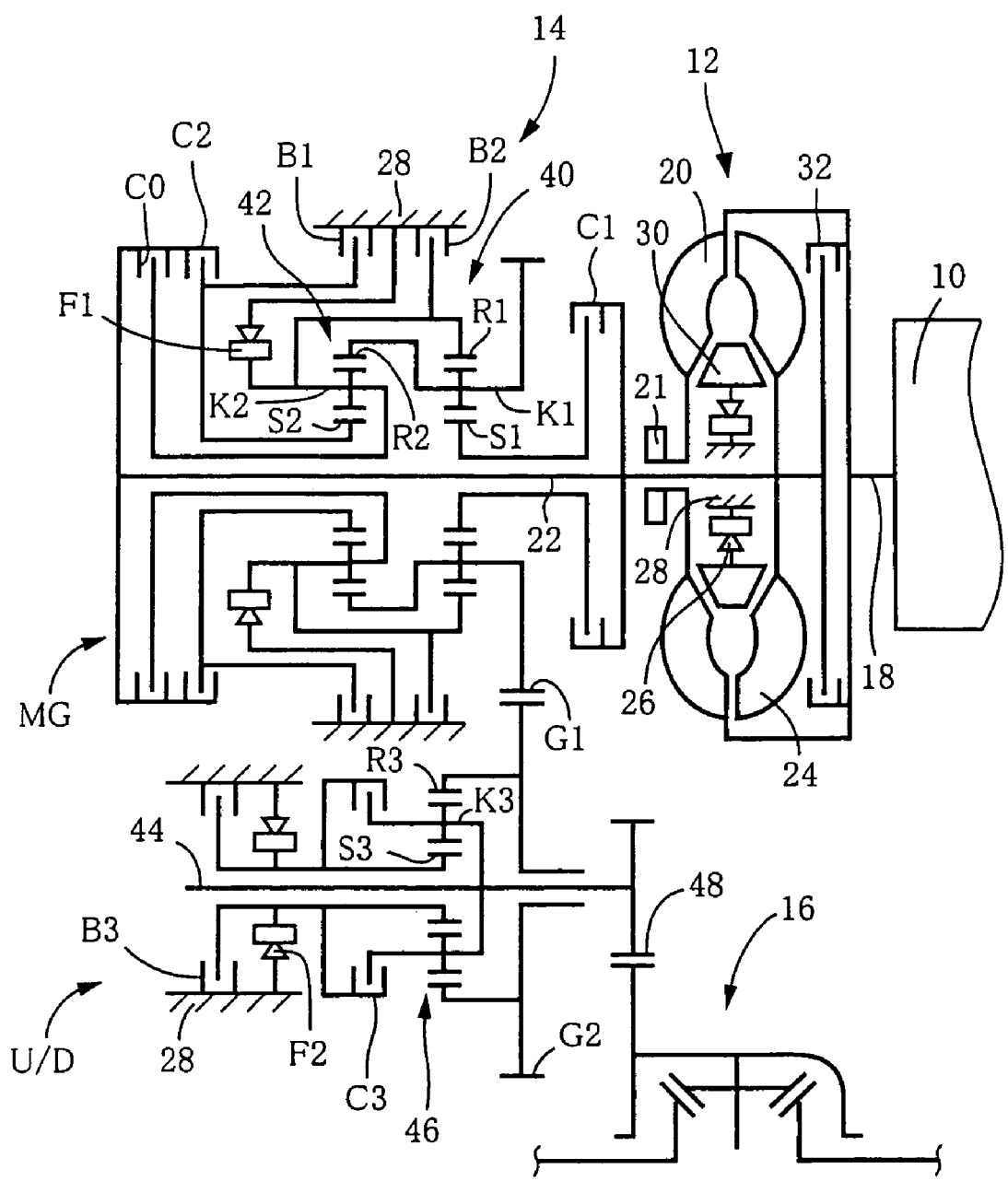
FIG. 1 is a schematic view illustrating an arrangement of a vehicular drive system to which the present invention is suitably applicable.

14: Automatic transmission
90: Electronic control device
120: Shift control means
122: Shifting-action deciding means
124: Shifting control means
132: Shift-pattern memory means (Memory device)
C0, C1, C2, C3: Clutches (Frictional coupling devices)
B1, B2, B3: Brakes (Frictional coupling devices)
Step 8: Selecting means

BEST MODE FOR CARRYING OUT THE INVENTION

The preferred embodiments of this invention will be described in detail, by reference to the drawings.

EMBODIMENT 1

Referring to the schematic view of FIG. 1, there is illustrated a vehicular drive system of transversal type suitable for an FF vehicle (front-engine front-drive vehicle), for example, wherein an output of an engine 10 such as a gasoline engine or other internal combustion engine is transmitted to front drive wheels (not shown) of a vehicle through a power transmitting device including a torque converter 12, an automatic transmission 14 and a differential gear device 16. The torque converter 12 includes: a pump impeller 30 connected to a crankshaft 18 of the engine 10; a turbine impeller 24 connected to an input shaft 22 of the automatic transmission 14; a stator 30 fixed to a stationary member in the form of a housing 28 through a one-way clutch 26; and a lock-up clutch 32 for direct coupling between the crankshaft 18 and the input shaft 20 through a damper (not shown). A mechanical oil pump 21 such as a gear pump is connected to the pump impeller 10, and driven by the engine 10 together with the pump impeller 20, to pressurize a working oil used for operating the automatic transmission 14 and lubricating the drive system. The engine 10 serves as a drive power source for running the vehicle, and the torque converter 12 serves as a fluid-operated coupling.

The automatic transmission 14 includes: a single-pinion type first planetary gear device 40 and a single-pinion type second planetary gear device 42 which cooperate to constitute a planetary gear mechanism of a so-called CR-CR connection type wherein the first and second planetary gear sets 40, 42 are disposed coaxially with the input shaft 22 such that the carrier and ring gear of the first planetary gear set 40 are respectively connected to the ring gear and carrier of the second planetary gear set 42; a third planetary gear set 46 disposed coaxially with a counter shaft 44 parallel to the input shaft 22; and an output gear 48 fixed to one end portion of the counter shaft 44 and meshing with a differential gear device 16. Elements of the planetary gear sets 40, 42, 46, that is, sun gears, ring gears and carriers which rotatably support planetary gears meshing with the sun gears and ring gears are selectively connected to each other through four clutches C0, C1, C2 and C3, and selectively fixed to the stationary member in the form of the housing 28 through three brakes B1, B2 and B3. Further, the sun gears, ring gears and carriers are connected to each other or brought into engagement with the housing 28, through two one-way clutches F1, F2, depending upon the direction of rotation of those elements. Since the differential gear device 16 are symmetrical with respect to its axis (vehicle axis), a lower part of the differential gear device 16 as seen in FIG. 1 is not shown in the figure.

A main shifting portion MG having four forward-drive positions and one reverse-drive position is constituted by the first and second planetary gear sets 40, 42 disposed coaxially with the input shaft 22, the clutches C0, C1, C1 and C2, the brakes B1 and B2, and the one-way clutch F1, while an auxiliary shifting portion in the form of an underdrive portion U/D is constituted by the third planetary gear set 46 disposed coaxially with the counter shaft 44, the clutch C3, the brake B3 and the one-way clutch F2. In the main shifting portion MG, the input shaft 22 is connected through the clutches C0, C1 and C2 to the carrier K2 of the second planetary gear set 42, the sun gear S1 of the first planetary gear set 40 and the sun gear S2 of the second planetary gear set 42, respectively. The ring gear R1 of the first planetary gear set 40 and the carrier K2 of the second planetary gear set 42 which are connected to each other are connected to the ring gear R2 of the second planetary gear set 42 and the carrier K1 of the first planetary gear set 40 which are connected to each other. The sun gear S2 of the second planetary gear set 42 is fixed to the stationary member in the form of the housing 28 through the brake B1, and the ring gear R1 of the first planetary gear set 40 is fixed to the stationary member in the form of the housing 28 through the brake B2. The one-way clutch F1 is disposed between the carrier K2 of the second planetary gear set 42 and the stationary member in the form of the housing 28. A first counter gear G1 fixed to the carrier K1 of the first planetary gear set 40 and a second counter gear G2 fixed to the ring gear R3 of the third planetary gear set 46 mesh with each other. In the underdrive portion U/D, the carrier K3 and sun gear S3 of the third planetary gear set 46 are connected to each other through the clutch C3, and the brake B3 and the one-way clutch F2 are disposed in parallel with each other, between the sun gear S3 and the stationary member in the form of the housing 28.

The above-described clutches C0, C1, C2 and C3 (collectively referred to as "clutches") and brakes B1, B2 and B3 (collectively referred to as "brakes") are hydraulically operated frictional coupling devices such as multiple-disc clutches or band brakes, which are engaged by hydraulic actuators. These frictional coupling devices are selectively engaged and released by energization and de-energization of solenoid valves S1-S5 and linear solenoid valves SL1, SL2, SLU of a hydraulic control circuit 98 (shown in FIG. 3), according to an operation of a manual valve (not shown), to selectively establish five forward-drive positions, one reverse-drive position, and a neutral position of the automatic transmission 14, as indicated in FIG. 2, according to a currently selected shift position of a shift lever 72 (shown in FIG. 3). In FIG. 2, "1$^{st}$" through "5$^{th}$" represent 1$^{st}$-speed position through 5$^{th}$-speed position, which are the forward-drive positions, and "O" and "X" respectively represent an engaged state and a released state of the clutch, brake or one-way clutch, while "Δ", represents a released state of the one-way clutch when a vehicle drive force is transmitted in the forward direction. The shift lever 72 has a parking position P, a reverse-drive position R, a neutral position N, and forward-drive positions D, 4, 3, 2 and L, and is operable to a selected one of those positions according to a shift path shown in FIG. 4, by way of example. When the shift lever 72 is placed in the parking position P or neutral position N, the automatic transmission 14 is placed in a non-drive position in the form of the neutral position in which the vehicle drive force is not transmitted. In the parking position P, the drive wheels are mechanically locked by a mechanical parking mechanism (not shown), to prevent rotation of the drive wheels.

Figure 3:
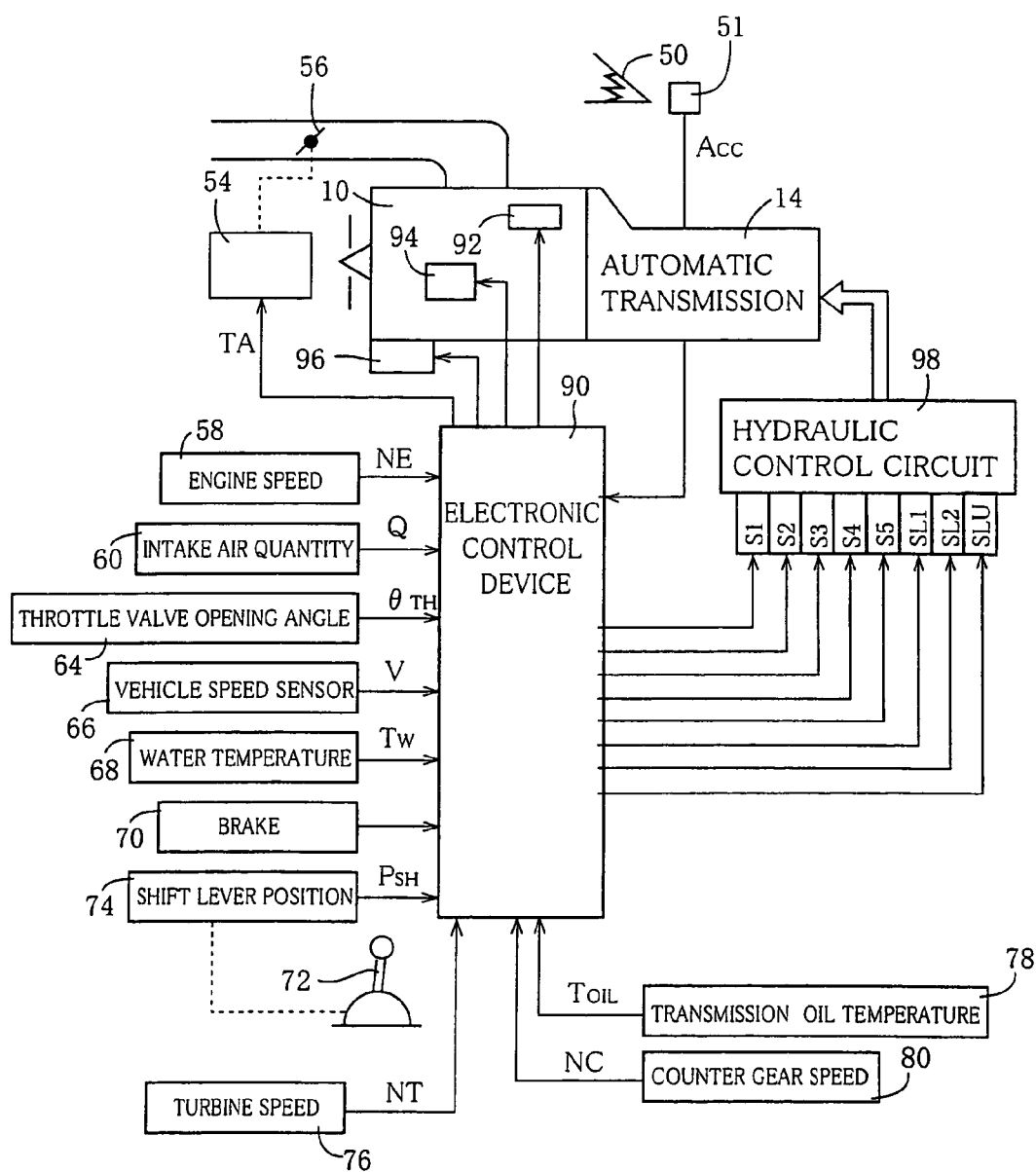
FIG. 3 is a block diagram illustrating a control system for controlling an engine and the automatic transmission of the vehicular drive system of FIG. 1.
Figure 4:
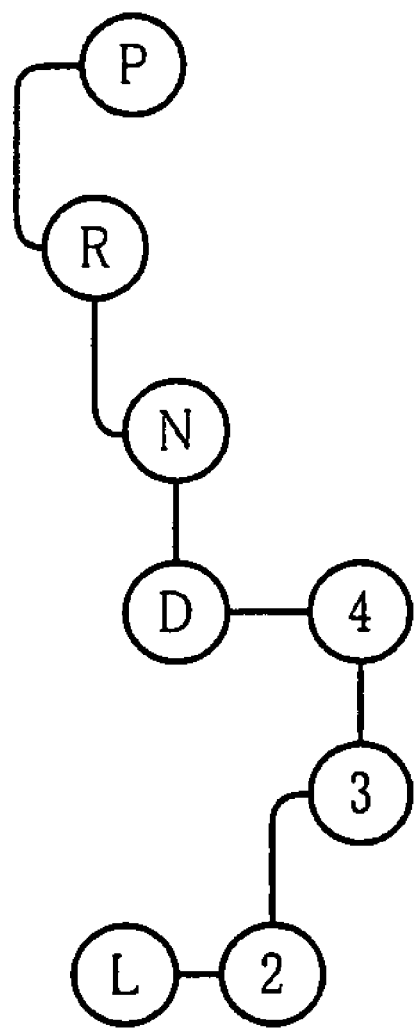
FIG. 4 is a view showing an example of a pattern of shift positions of a shift lever shown in FIG. 3.
Figure 5:
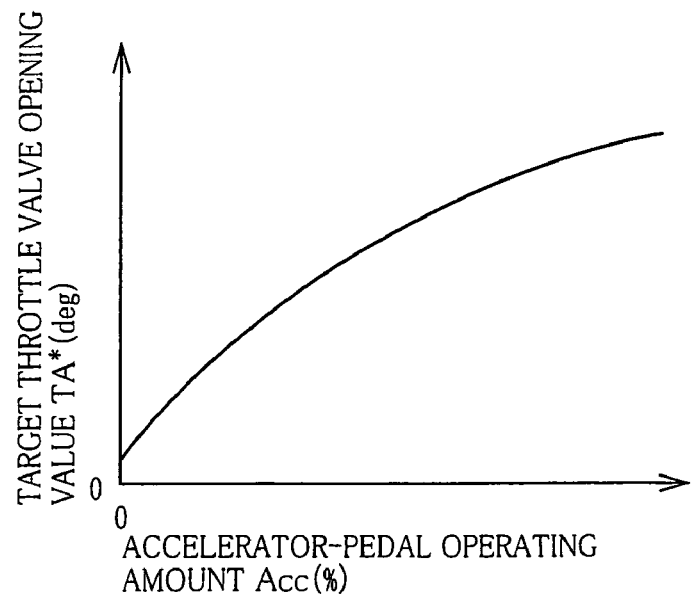
FIG. 5 is a view indicating an example of a relationship between an accelerator-pedal operating amount $A_{CC}$ and a target throttle-valve opening value TA*, which relationship is used by an electronic control device shown in FIG. 3, to control the throttle valve.

Referring to the block diagram of FIG. 3, there is shown a control system provided on the vehicle to control the engine 10 and automatic transmission 14 shown in FIG. 1. In this control system, an operating amount $A_{CC}$ of an accelerator pedal 50 is detected by an accelerator-operating-amount sensor 51. The accelerator pedal 50 is operated by the operator of the vehicle, by an amount corresponding to an engine output as desired by the operator. In this respect, the accelerator pedal 50 serves as a manually operated accelerating member, and the accelerator-pedal operating amount $A_{CC}$ represents the desired engine output. In an intake pipe of the engine 10, there is disposed an electronic throttle valve 56 whose opening angle $\theta_{TH}$ is changed by a throttle actuator 56 according to a commanded throttle-valve opening value TA. The commanded throttle-valve opening value TA corresponds to the opening angle $\theta_{TH}$, and is principally determined on the basis of the accelerator-pedal operating amount $A_{CC}$ and according to a map representative of a predetermined relationship between the accelerator-pedal operating amount ACC and a target throttle-valve opening value TA*, which relationship is indicated in FIG. 5 by way of example. The target throttle-valve opening value TA* and the commanded throttle-valve opening value TA are increased with an increase in the accelerator-pedal operating amount $A_{CC}$, so that the opening angle $\theta_{TH}$ of the throttle valve is increased to increase the engine output.

The control system further includes: a engine-speed sensor 58 for detecting a speed NE of the engine 10; an intake-air-quantity sensor 60 for detecting an intake air Q of the engine 10; a throttle sensor 74 with an engine-idling switch for detecting a fully closed state (engine-idling state) and the opening angle $\theta_{TH}$ of the electronic throttle valve 56; a vehicle-speed sensor 66 for detecting a rotating speed $N_{OUT}$ of the counter shaft 44 which reflects a vehicle running speed V; a water-temperature sensor 68 for detecting a temperature $T_W$ of coolant water of the engine 10; a brake switch 70 for detecting operated and non-operated states of a brake pedal; a shift-lever-position sensor 74 for detecting a currently selected position $P_{SH}$ of the shift lever 72; a turbine-speed sensor 76 for detecting a rotating speed NT (rotating speed $N_{IN}$ of the input shaft 22); a transmission-oil-temperature sensor 78 for detecting a temperature $T_{OIL}$ of the working oil in the hydraulic control circuit 98; and a counter-gear-speed sensor 80 for detecting a rotating speed NC of the first counter gear G1. An electronic control device 90 receives output signals of those sensors indicative of the engine speed NE, intake air quantity Q, throttle valve opening angle $\theta_{TH}$, vehicle running speed V, engine coolant water temperature $T_W$, operated or non-operated state of the brake pedal, currently selected position $P_{SH}$ of the shift lever 72, turbine speed NT, transmission oil temperature $T_{OIL}$ and counter-gear speed NC. The brake switch 70 is an on-off switch which is turned on and off depending upon whether the brake pedal for a service brake system is operated or released.

Figure 7:
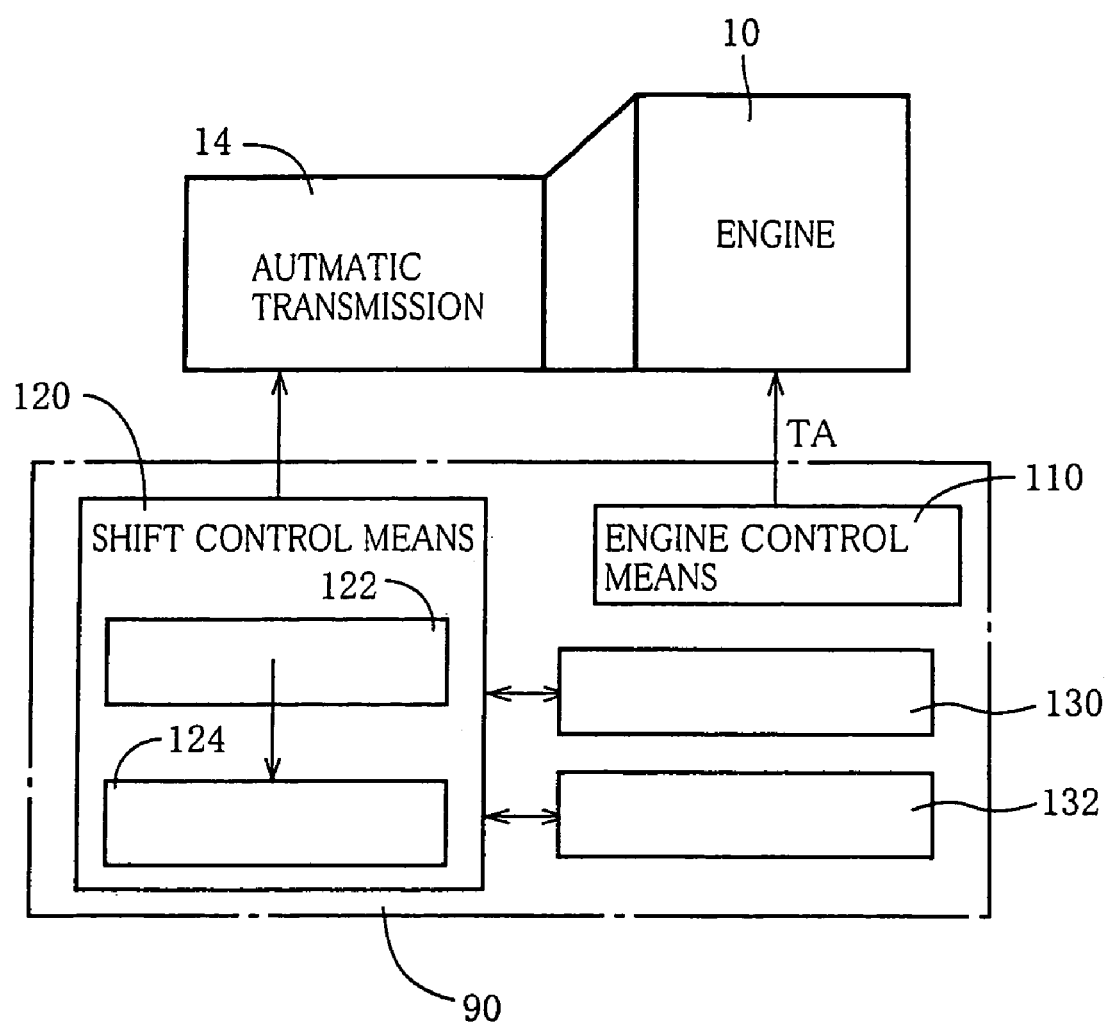
FIG. 7 is a block diagram showing major control functions of the electronic control device of FIG. 3.

The electronic control device 90 includes a so-called microcomputer incorporating a CPU, a RAM, a ROM and an input/output interface. The CPU operates to perform signal processing operations according to control programs stored in the ROM, while utilizing a temporary data storage function of the RAM, in order to effect an output control of the engine 10 and a shift control of the automatic transmission 14. As shown in FIG. 7, the electronic control device 90 includes functional means in the form of engine control means 110 and shift control means 120, which are operated independently of each other as needed.

The engine control means 110 is operable to controls the throttle actuator 54 for controlling the opening and closing actions of the electronic throttle valve 56, controls a fuel injection valve 92 for controlling the amount of injection of a fuel, controls igniters of an ignition device 94 for controlling their ignition timings, and controls a starter (an electric motor) for cranking the crankshaft 18 to start the engine 10. To effect the opening and closing actions of the electronic control valve 56, the engine control means 110 is basically arranged to determine the target throttle-valve opening value TA* on the basis of the actual accelerator-pedal operating amount $A_{CC}$ and according to a relationship between the target throttle-valve opening value TA* and the accelerator-pedal operating amount $A_{CC}$, which is shown in FIG. 5, and uses the determined target throttle-valve opening angle TA* as the commanded throttle-valve opening value TA to control the throttle actuator 54 such that the actual throttle-valve opening angle $\theta_{TH}$ increases with an increase of the accelerator-pedal operating amount $A_{CC}$. For effecting a traction control or any other special control, however, the engine control means 110 determines the commanded throttle-valve opening value TA irrespective of the target throttle-valve opening value TA* corresponding to the accelerator-pedal operating amount $A_{CC}$.

The shift control means 120 includes shifting-action deciding means 122 and shifting control means 124. The shifting-action deciding means 122 is arranged to determine, from time to time, a target speed position of the automatic transmission 14 on the basis of the actual accelerator-pedal operating amount $A_{CC}$ and the actual vehicle speed V and according to the shift boundary lines (shift boundary line map) of FIG. 6 stored as shifting conditions in shifting-condition memory means 130, and decide whether the presently established speed position of the automatic transmission is different from the determined target speed position. On the other hand, the shifting control means 124 is arranged to effect a shifting control to shift the automatic transmission 14 to the decided target speed position when it is decided that the present speed position is different from the decided target speed position.

Figure 6:
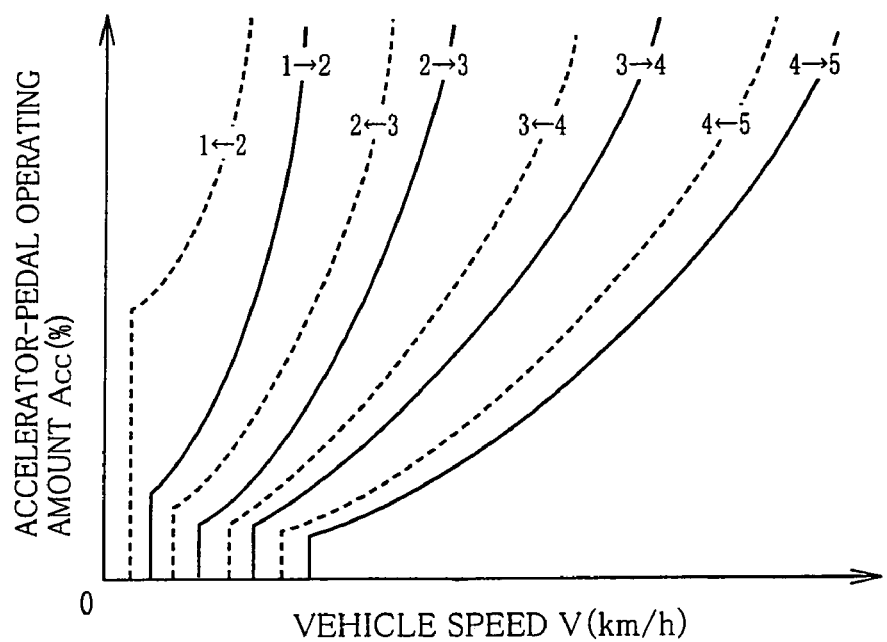
FIG. 6 is a view indicating an example of shift boundary lines (shift boundary line map) used by the electronic control device of FIG. 3 to control shifting actions of the automatic transmission.

The shifting-action deciding means 122 decides the target speed position from time to time even during a shifting control by the shifting control means 124 according to a first shifting-action decision by the shifting-action deciding means 122. In FIG. 6, solid lines represent shift-up boundary lines, while broken lines represent shift-down boundary lines. These shift-up and shift-down boundary lines are determined to shift the automatic transmission 14 to a speed position having a higher speed ratio (input speed $N_{IN}$/output speed $N_{OUT}$) than the present speed position, when the vehicle speed V is lowered or when the accelerator-pedal operating amount $A_{CC}$ is increased. In the same figure, "1" through "5" represent the $1^{st}$-speed position through the $5^{th}$-speed position, respectively. The shift-up boundary lines are determined so that the vehicle drive force adequately increases with an increase of the accelerator-pedal operating amount $A_{CC}$, while the shift-down boundary lines are determined so that a vehicle decelerating force increases with an increase of the operating amount of the brake pedal and a decrease of the accelerator-pedal operating amount $A_{CC}$.

When the shifting-action deciding means 122 has made a second shifting-action decision during the shifting control of the automatic transmission 14 according to the first shifting-action decision, the shifting control means 124 immediately effects a shifting control according to the second shifting-action decision. In this case, the shifting control according to the second shifting-action decision is effected according to a flow chart of FIG. 10.

To effect the shifting control to shift the automatic transmission 14 to the target speed position, the shifting control means 124 first select a single shift pattern or a combination of a plurality of shift patterns, from a plurality of shift patterns stored in shift-pattern memory means 132. The shifting control means 124 turns on (energizes) or off (de-energizes) the solenoid valves S1-S5 of the hydraulic control circuit 98 for selectively engaging and releasing the clutches C and brakes B so as to establish the speed position according to the selected single shift pattern or sequentially establish the speed positions according to the selected combination of shift patterns. The shifting control means 124 continuously controls the amounts of electric current applied to the linear solenoid valves SL1, SL2 and SLU, so as to prevent a shifting shock of the automatic transmission 14 due to a change of the vehicle drive force, or deterioration of durability of the friction members of the clutches and brakes.

The shift-pattern memory means 132 stores shift-pattern information representative of the above-indicated plurality of shift patterns and required shifting times of the shifting patterns. FIG. 8 indicates an example of the shift-pattern information in the form of shift-down-pattern information representative of shift-down patterns. Each of the stored shift patterns is a shifting action or a combination of shifting actions of the automatic transmission 14, which can be comparatively easily achieved without a shifting shock. The stored shift patterns are determined depending upon the specific configuration of the automatic transmission 14. The stored shift-down patterns of FIG. 8 include: one-step shift-down patterns (Nos. 1-4); successive two-step shift-down patterns (Nos. 7, 9 and 10); one-step jumping shift-down patterns (Nos. 5 and 6); and two-step jumping shift-down pattern (No. 8). The shift-pattern memory means 132 also stores shift-up-pattern information representative of shift-up patterns (not shown). The shifting action or combination of shifting actions according to each of the stored shift patterns can be achieved by controlling only one or two of the frictional coupling devices (clutches C and brakes B). The required shifting times of the shifting patterns are predetermined lengths of time, but may be determined on the basis of vehicle condition parameters such as acceleration and deceleration values of the vehicle. The shift-pattern memory means 132 correspond to memory means, and the shift-pattern memory means 132 and the shifting-condition memory means 130 may be provided in the above-indicated RAM or ROM.

Figure 9:
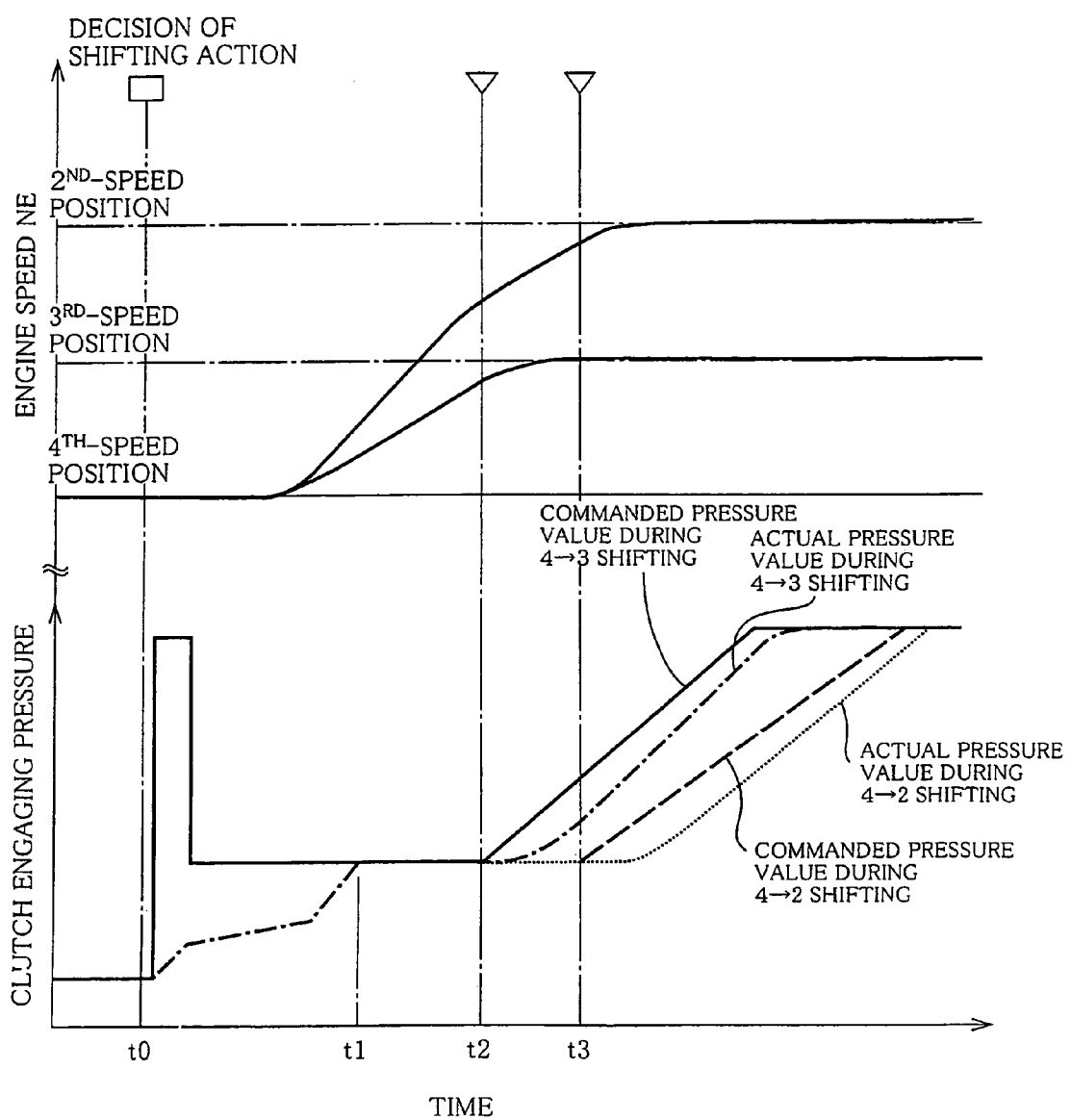
FIG. 9 is a time chart illustrating changes of a clutch engaging pressure and an engine speed NE during a 4-3 shift-down action and a 4-2 shift-down action of the automatic transmission under the control of shift control means shown in FIG. 7.

Referring to the time chart of FIG. 9, there are illustrated changes of a clutch engaging pressure and the engine speed NE during a 4-3 shift-down action and a 4-2 shift-down action of the automatic transmission 14 under the control of the shift control means 120. When a shifting-action decision is made at a point of time t0, a shifting control according to the shifting-action decision is initiated. In this shifting control, a commanded hydraulic pressure value of the linear solenoid valve SL to control the clutch engaging pressure is once abruptly raised and is then reduced to a level which is higher by a predetermined amount than the level before initiation of the shifting control. As is apparent from FIG. 2, the 4-3 shift-down action and the 4-2 shift-down action are both achieved by engaging the clutch C1. After the moment of initiation of the shifting control to effect the 4-3 or 4-2 shift-down action, the working oil is fed to the clutch C1, and this clutch C1 is filled with the working oil at a point of time t1, that is, at a moment when the actual hydraulic pressure of the clutch C1 becomes equal to the commanded hydraulic pressure value. Thus, the clutch C1 is placed in a pressure-adjustable state, without a considerable time delay from the moment of initiation of the shifting control. In the pressure-adjustable state, the clutch engaging pressure can be adjusted.

The hydraulic pressure (not shown in FIG. 9) of the frictional coupling device to be released to achieve the shifting control according to the shifting-action decision is reduced, so that the engine speed NE begins to rise, as shown in FIG. 9. The rate at which the hydraulic pressure of the frictional coupling device to be released is lowered is controlled so that the rate of initial rise of the engine speed NE during the 4-3 shift-down action is lower than that during the 4-2 shift-down action. The frictional coupling device to be released to achieve the 4-3 shift-down action is the brake B1, while the frictional coupling device to be released to achieve the 4-2 shift-down action is the clutch C0.

The rate of reduction of the hydraulic pressure of the frictional coupling device to be released and the rate of rise of the engine speed NE are controlled as described above, in order to raise the hydraulic pressure of the clutch C1 to be engaged to a level permitting a synchronous control of the clutch C1, before the engine speed NE rises to a level determined by the speed position established by the shift-down action, that is, to a speed of synchronization of the clutch C1. A difference between the engine speed values NE before and after the one-step 4-3 shift-down action is smaller than a difference between the engine speed values NE before and after the two-step 4-2 shift-down action, so that the engine speed NE is raised in the one-step 4-3 shift-down action at a comparatively low rate, to allow a sufficient time for the hydraulic pressure of the clutch C1 to rise. In the two-step 4-2 shift-down action, on the other hand, the hydraulic pressure of the clutch C1 is initially raised at a comparatively high rate, since the hydraulic pressure can be easily raised at a comparatively low rate after the relatively rapidly raised hydraulic pressure reaches a level slightly below the level of synchronization of the clutch C1.

The synchronous control of the 4-3 shift-down action is initiated at a point of time t2, and the synchronous control of the 4-2 shift-down action is initiated at a point of time t3. This point of time at which the synchronous control is initiated can be detected on the basis of a difference between the present engine speed value NE and the engine speed value NE after the shift-down action to the new speed position, and a rate of rise of the engine speed NE. When the point of time of initiation of the synchronous control is detected, the commanded hydraulic pressure value is raised at a predetermined comparatively low rate. This comparatively low rate of rise of the commanded hydraulic pressure value is determined to reduce the shifting shock of the automatic transmission 14 due to inconsistency between the timing of the releasing action of the frictional coupling device to be released and the timing of the engaging action of the clutch C1 to be engaged, which inconsistency may take place due to a variation in the hydraulic pressure control characteristic and a detecting error of the engine speed sensor 58.

Figure 10:
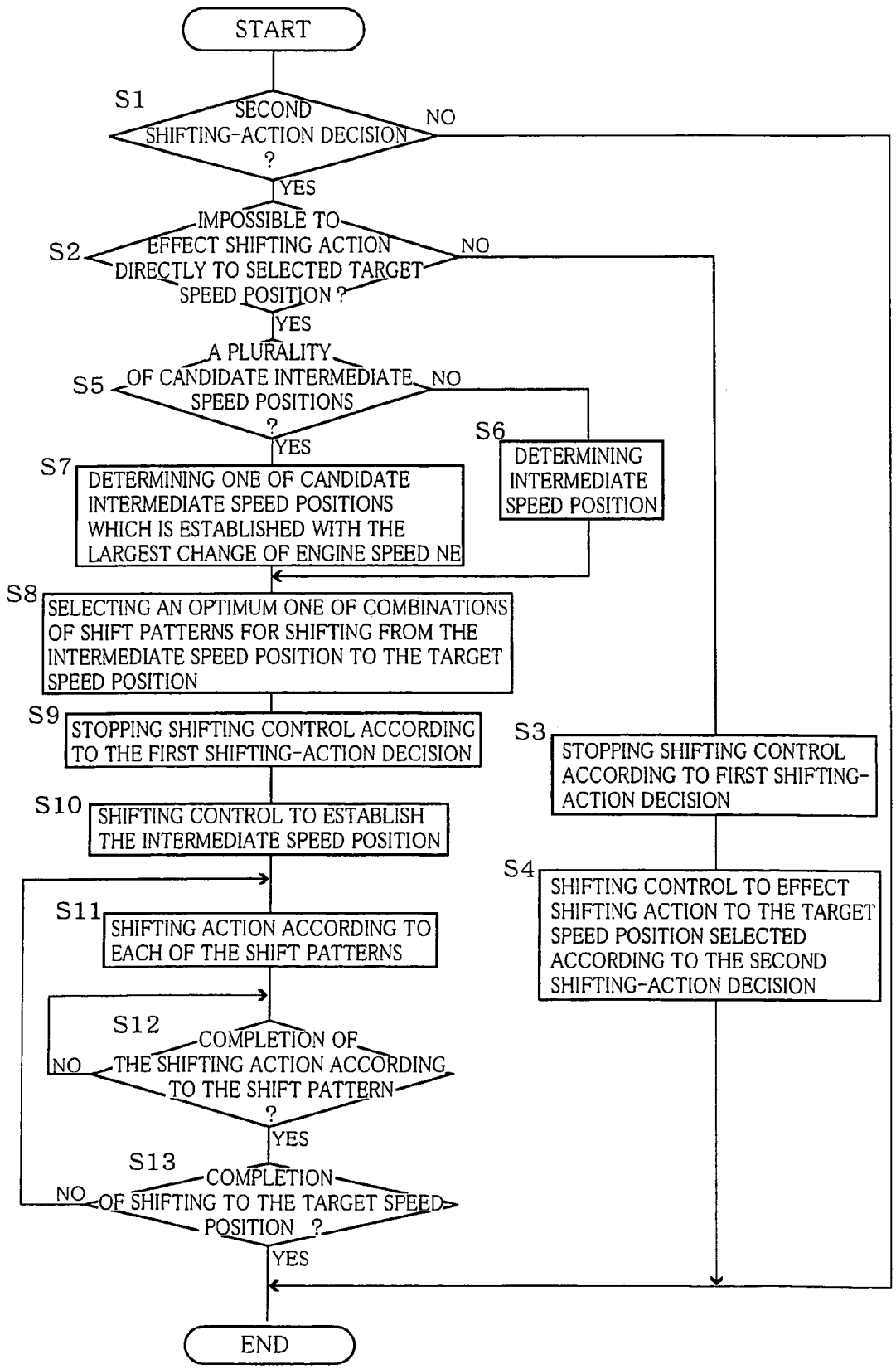
FIG. 10 is a flow chart illustrating control functions of the shift control means of FIG. 7, which are performed during a shifting control according to a first shifting-action decision.

The flow chart of FIG. 10 illustrates control functions of the shift control means 120, which are performed during a shifting control according to the first shifting-action decision. A control routine of FIG. 10 is executed from time to time, with a predetermined comparatively short cycle time. In the control routine of FIG. 10, step S1 is implemented to decide whether a second shifting-action decision is made. This decision is made according to the shift boundary lines of FIG. 6. If a negative decision is made in step S1, the execution of the present control routine is terminated. An affirmative decision is made in step S1 if a newly selected target speed position of the automatic transmission 14 is different from the target speed position selected according to the first shifting-action decision, due to a change of the vehicle running condition or an operation of the vehicle operator. This step S1 corresponds to the above-described shifting-action deciding means 122, which is arranged to make a decision of a shifting action of the automatic transmission 14 to the newly selected speed position.

If the affirmative decision is made in step S1, the control flow goes to step S2 to decide whether it is impossible to shift the automatic transmission 14 directly to the target speed position newly selected according to the second shifting-action decision. This decision is made depending upon whether the number of the frictional coupling devices that should be concurrently controlled to establish the newly selected target speed position is larger than a predetermined upper limit number (e.g., two) of the frictional coupling devices that can be concurrently controlled. If a negative decision is made in step S2, that is, if the automatic transmission 14 can be shifted directly to the newly selected target speed position, the control flow goes to step S3 to stop the shifting control according to the first shifting-action decision, and to step S4 to effect a shifting control to shift the automatic transmission 14 to the target speed position selected according to the second shifting-action decision.

If an affirmative decision is made in step S2, the control flow goes to step S5 to decide whether there are a plurality of candidate intermediate speed positions. The candidate speed positions are speed positions which are different from the newly selected target speed position and to which the automatic transmission 14 can be shifted directly at the moment of decision in step S1. If a negative decision is made in step S5, that is, if there is only one candidate intermediate speed position to which the automatic transmission can be shifted directly, the control flow goes to step S6 to determine that candidate intermediate speed position as an intermediate speed position.

If an affirmative decision is made in step S5, the control flow goes to step S7 to:determine, as the intermediate speed position, one of the candidate intermediate speed positions which is established with the largest amount of change of the engine speed NE. The largest amount of change of the engine speed NE means the longest time required for completion of the change of the engine speed NE, during which the clutch engaging pressure can be raised. Accordingly, the clutch engaging pressure can be raised at the lowest rate to establish the intermediate speed position, whereby the shifting shock can be reduced.

Figure 11:
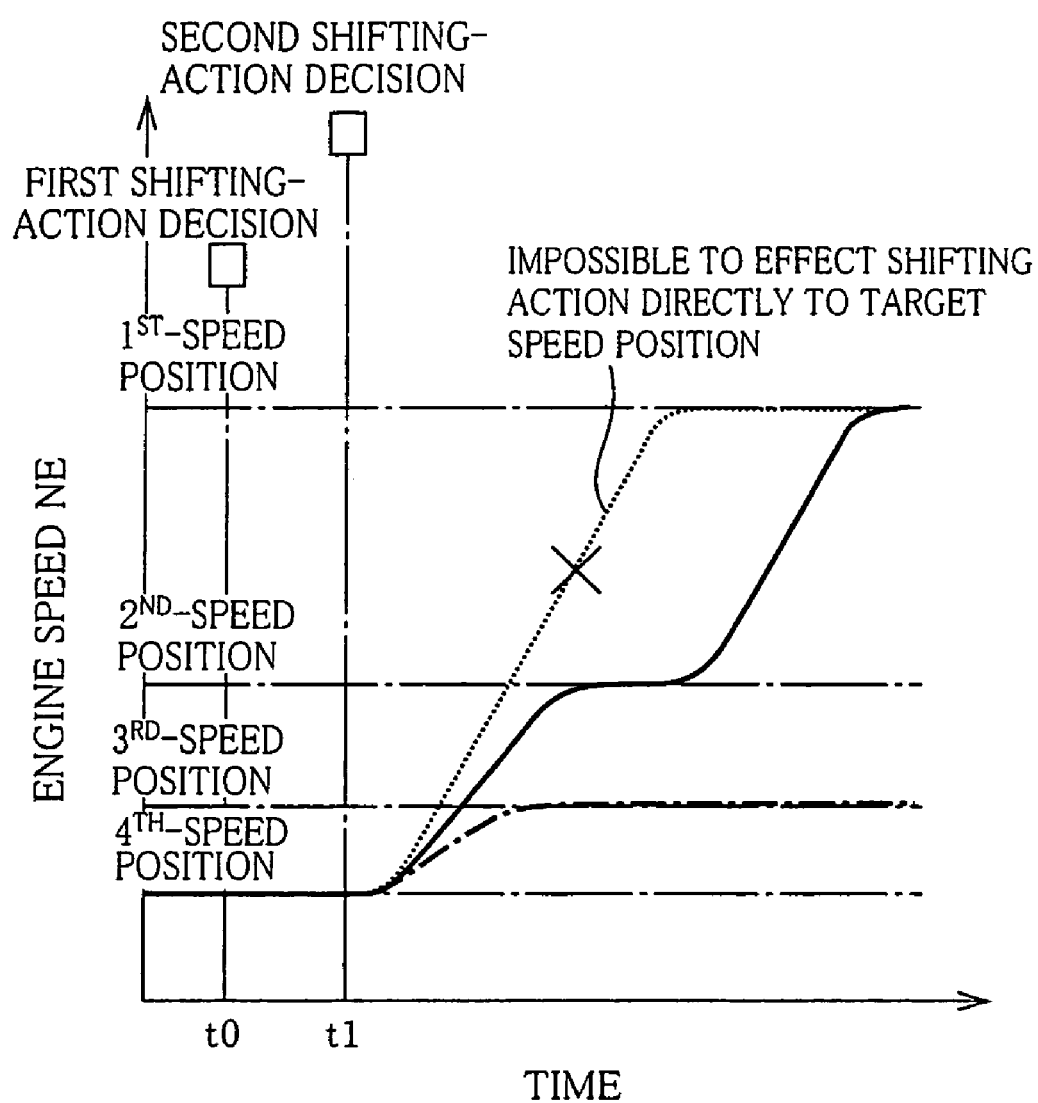
FIG. 11 is a view showing an example of a case in which a decision that there are a plurality of candidate intermediate speed positions is made in step S5 of FIG. 10.

Referring to FIG. 11, there is shown an example of a case in which the affirmative decision that there are a plurality of candidate intermediate speed positions is made in step S5. In this example, the first shifting-action decision to effect the 4-3 shift-down action is made at a point of time t0, and the second shifting-action decision to effect the 4-1 shift-down action is made at a point of time t1 which is prior to the moment of initiation of a rise of the engine speed NE. Namely, the selected target speed position is changed from the $3^{rd}$-speed position to the $1^{st}$-speed position at the point of time t1. It is noted that the 4-1 shift-down action from the $4^{th}$-speed position to the $1^{st}$-speed position requires the releasing actions of the clutch C0 and the brake B1 and the engaging action of the clutch C1, that is, the number of the frictional coupling devices that should be concurrently controlled is larger than the predetermined upper limit number, so that it is impossible to effect the 4-1 shift-down action directly to the $1^{st}$-speed position. In the present example, therefore, the affirmative decision is made in step S2, and the control flow goes to step S5.

In the example of FIG. 11, the reduction of the hydraulic pressure of the brake B1 and the rise of the hydraulic pressure of the clutch C1 are initiated as a result of the first shifting-action decision, although the figure does not show the reduction and rise of these hydraulic pressures. At the point of time t1 at which the actual rise of the engine speed NE has not been initiated yet, it is possible to effect the shift-down action to the $2^{nd}$-speed position by stopping the reduction of the hydraulic pressure of the brake B1, raising the rise of this hydraulic pressure, and reducing the hydraulic pressure of the clutch C0 rather than the hydraulic pressure of the brake B1. It is also noted that it is possible to continue the shifting control according to the first shifting-action decision, namely, to effect the shift-down action to the $3^{rd}$-speed position. Thus, at the point of time t1, there are two candidate intermediate speed positions, that is, the $2^{nd}$-speed position and the $3^{rd}$-speed position. However, the 4-2 shift-down action causes a larger amount of change of the engine speed NE than the 4-3 shift-down action. In step S2, therefore, the $2^{nd}$-speed position is determined as the intermediate speed position.

Subsequently, step S8 corresponding to selecting means is implemented to select, from the shift patterns stored in the shift-pattern memory means 132, a single shift pattern or one of combinations of shift patterns which permits the shifting action from the intermediate speed position to the target speed position selected according to the second shifting-action decision in the shortest time. In the example of FIG. 11 in which the intermediate speed position is the $2^{nd}$-speed position while the target speed position is the $1^{st}$-speed position, the single 2-1 shift-down pattern is selected. If it is impossible to effect the action from the intermediate speed position directly to the target speed position, however, this shifting action is effected according to a combination of a plurality of shift patterns. If there are two or more combinations of shift patterns for shifting from the intermediate speed position to the target speed position, an optimum one of the combinations which requires the shortest total shifting time is selected. To this end, the total shifting times for all of the combinations are calculated on the basis of the shifting times of the shift patterns stored in the shift-pattern memory means 132. If the intermediate speed position is the $4^{th}$-speed position, there are four combinations of shift patterns. As is apparent from FIG. 8, these four combinations are: (1) 4-3 shift-down pattern and 3-1 shift-down pattern; (2) 4-3 shift-down pattern, 3-2 shift-down pattern and 2-1 shift-down pattern; (3) two-step 4-3-2 shift-down pattern and 2-1 shift-down pattern; and (4) 4-2 shift-down pattern and 2-1 shift-down pattern. In this case, one of the four combinations the calculated total shifting time of which is the shortest is selected.

Then, the control flow goes to step S9 to stop the shifting control according to the first shifting-action decision, and to step S10 to effect a shifting control to establish the intermediate speed position determined in step 6 or step 7. In the following step S11, the solenoid valves S1-S5 of the hydraulic control circuit 98 are appropriately turned on and off to engage and release the appropriate clutches C and brakes B to shift the automatic transmission according to each of the shift patterns of the combination selected in step S8, while the amounts of electric current applied to the linear solenoid valves SL1, SL2 and SLU are continuously controlled to control the hydraulic pressures of the clutches C and brakes B being engaged and released.

In step S12, a decision is made as to whether the shifting of the automatic transmission 14 according to the shift pattern in question is completed. This decision is made on the basis of command signals to the solenoid valves S1-S5 and linear solenoid valves SL1, SL2 and SLU. If the shifting according to the shift pattern in question is completed, the control flow goes to step S13.

Step S13 is provided to decide whether the target speed position has been established. This decision is made on the basis of the command signals to the solenoid valves S1-S5. If the target speed position has been established, one cycle of execution of the present control routine is terminated. If the target speed position has not been established, step S11 and the following steps are repeated to shift the automatic transmission according to the next shift pattern.

EMBODIMENT 2

Then, a second embodiment of this invention will be described. In the following description, the same reference signs are used to identify the elements common to the different embodiments.

Figure 12:
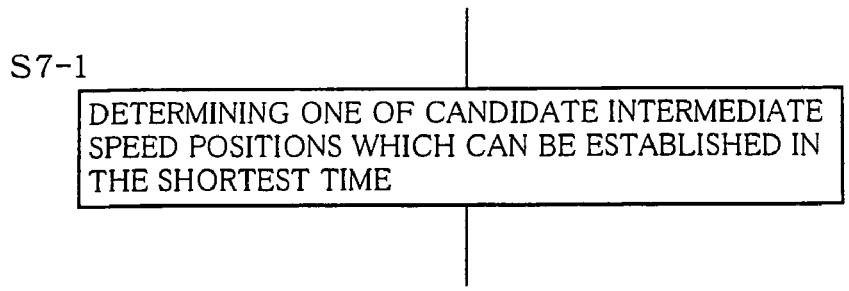
FIG. 12 is a part of a flow chart illustrating control functions of shift control means according to a second embodiment of this invention, which are performed during a shifting control according to a first shifting-action decision.

The second embodiment is different to the first embodiment, only in the control functions which are performed by the shift control means 120 and illustrated in FIG. 12, which is a part of a flow chart illustrating control functions of the shift control means 120 according to the second embodiment of this invention, which are performed during a shifting control according to the first shifting-action decision. The only step illustrated in FIG. 12 replaces step S7 of FIG. 10. Namely, step S7-1 is implemented if it is decided in step S5 of FIG. 10 that there are a plurality of candidate intermediate speed positions.

Figure 13:
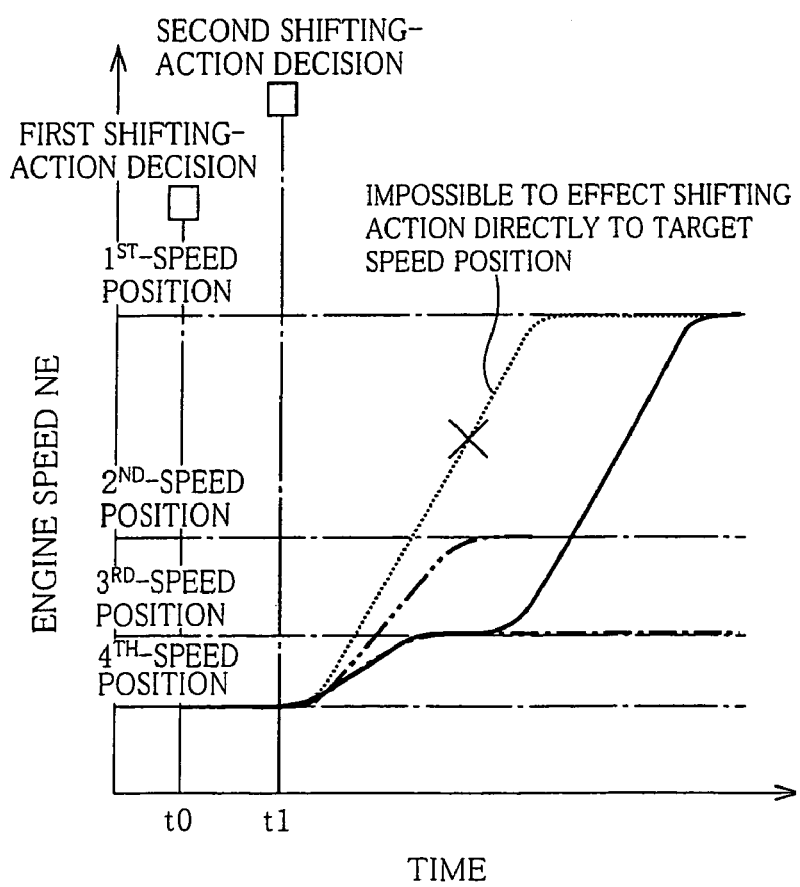
FIG. 13 is a view illustrating a change of the engine speed NE in the second embodiment.

In this step S7-1, one of the candidate intermediate speed positions which can be established in the shortest time is determined as the intermediate speed position. Like FIG. 11, FIG. 13 shows a case in which a first shifting-action decision to effect the 4-3 shift-down action is made at the point of time t0, and a second shifting-action decision to effect shifting to the $1^{st}$-speed position as the target speed position is made at the point of time t1 which is prior to the moment of initiation of a rise of the engine speed NE. In this example, there are two candidate intermediate speed positions which are the $2^{nd}$-speed position and the $3^{rd}$-speed position, as in the example of FIG. 11. FIG. 13 also shows the 4-2 shift-down action, for comparison with the 4-3 shift-down action. As is apparent from FIG. 13, the $3^{rd}$-speed position can be established in a shorter time than the $2^{nd}$-speed position. Accordingly, the $3^{rd}$-speed position is determined as the intermediate speed position in step S7-1. The required shifting times are calculated on the basis of the shift-pattern information stored in the shift-pattern memory means 132.

In the second embodiment wherein one of the plurality of intermediate speed positions which can be established in the shortest time is determined as the intermediate speed position, the intermediate speed position can be rapidly established, so that the time required to establish the target speed position can also be reduced.

Although the second embodiment is arranged to determine the $3^{rd}$-speed position as the intermediate speed position since the $3^{rd}$-speed position can be established in a shorter time than the $2^{nd}$-speed position, the time required to establish the $2^{nd}$-speed position may be shorter than the time required to establish the $3^{rd}$-speed position, depending upon the hydraulically operating characteristics of the frictional coupling device to be engaged. Where the clutch to be engaged to effect the 4-3 shift-down action and the clutch to be engaged to effect the 4-2 shift-down action are different clutches, for example, the time required to establish the pressure-adjustable state of the clutch to be engaged to effect the 4-3 shift-down action may be longer than the time required to establish of the pressure-adjustable state of the clutch to be engaged to effect the 4-2 shift down action. In this case, the time required to establish the $2^{nd}$-speed position may be made shorter than the time required to establish the $3^{rd}$-speed position, by increasing the rate of initial rise of the engine speed NE during the 4-2 shift-down action. The engine speed NE is initially raised at a comparatively high rate during the 4-2 shift-down action because the difference between the engine speed values NE before and after the 4-2 shift-down action is large enough to permit the engine speed NE to be raised at a comparatively low rate after the engine speed NE has reached the speed of synchronization.

EMBODIMENT 3

Figure 14:
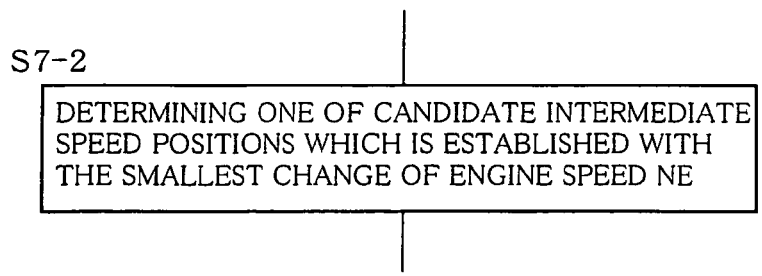
FIG. 14 is a part of a flow chart illustrating control functions of shift control means according to a third embodiment of this invention, which are performed during a shifting control according to a first shifting-action decision.

A third embodiment of this invention will be described by reference to FIG. 14, which is a part of a flow chart illustrating control functions of the shift control means 120 according to the third embodiment of this invention, which are performed during a shifting control according to the first shifting-action decision. The only step illustrated in FIG. 14 replaces step S7 of FIG. 10. Namely, step S7-2 is implemented if it is decided in step S5 of FIG. 10 that there are a plurality of candidate intermediate speed positions.

Figure 15:
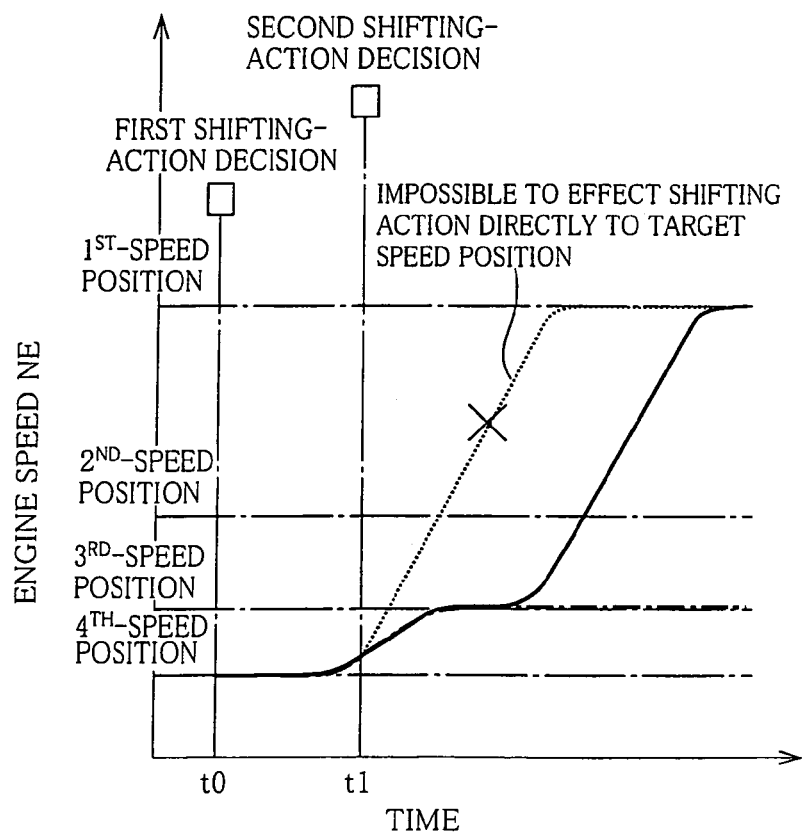
FIG. 15 is a view illustrating a change of the engine speed NE in the third embodiment.

In this step S7-2, one of the candidate intermediate speed positions which is established with the smallest amount of change of the engine speed NE in a direction to establish the intermediate speed position is determined as the intermediate speed position. In an example of FIG. 15, a first shifting-action decision to effect the 4-3 shift-down action is made at the point of time t0, and a second shifting-action decision to effect shifting to the $1^{st}$-speed position as the target speed position is made at the point of time t1 at which the engine speed NE has been slightly raised.

If the shifting action directly to the $3^{rd}$-speed position or the $2^{nd}$-speed position is possible at the point of time t1, the $3^{rd}$-speed position is established with a smaller amount of change of the engine speed NE, than the $2^{nd}$-speed position. In step S7-2, therefore, the $3^{rd}$-speed position is determined as the intermediate speed position. The third embodiment is suitably applicable to an automatic transmission in which the 4-3 shift-down action and the 4-2 shift-down action are achieved by releasing the same frictional coupling device, and by engaging the respective different frictional coupling devices.

In the third embodiment wherein one of the plurality of intermediate speed positions which is established with the smallest amount of change of the engine speed NE in a direction to establish the intermediate speed position is determined as the intermediate speed position, the intermediate speed position can be rapidly established, so that the time required to establish the target speed position can also be reduced.

While the preferred embodiments of this invention have been described above in detail by reference to the drawings, for illustrative purpose only, it is to be understood that the present invention may be embodied with various changes and improvements which may occur to those skilled in the art.

What is claimed is:

1. A shift control apparatus for controlling an automatic transmission having a plurality of speed positions having respective different speed ratios and established by selectively engaging a plurality of frictional coupling devices, such that a shifting control to shift the automatic transmission to a target speed position according to a first shifting-action decision is switched to a shifting control to shift the automatic transmission to a target speed position according to a second shifting-action decision made during the shifting control according to the first shifting-action decision, said shift control apparatus comprising:

shift control means operable, when it is impossible to shift the automatic transmission directly to the target speed position according to said second shifting-action decision, for determining, as an intermediate speed position of the automatic transmission, one of the speed positions to which the automatic transmission can be shifted directly at a moment of said second shifting-action decision, and effecting the shifting control to shift the automatic transmission to the target speed position according to said second shifting-action decision after establishing said intermediate speed positions, wherein the shift control means determines, as said intermediate speed position, one of said speed positions of the automatic transmission that can be directly established at the moment of said second shifting-action decision, which one speed position is established with a largest amount of change of a speed of an engine.

2. The shift control apparatus according to claim 1, further comprising:

shift-pattern memory means for storing a plurality of shift patterns of the automatic transmission and shifting times of said plurality of shift patterns; and selecting means, operable when there are a plurality of combinations of said shift patterns which permit a shifting action of the automatic transmission from said intermediate speed position to the target speed position according to said second shifting-action decision, for obtaining total shifting times of said plurality of combinations of the shift patterns on the basis of said shifting times stored in said shift-pattern memory means, and selecting one of the combinations the total shifting time of which is the shortest, wherein said shift control means effects the shifting control to shift the automatic transmission from said intermediate speed position to said target speed position according to the combination of the shift patterns selected by said selecting means.

3. The shift control apparatus according to claim 1, wherein the shift control means compares a provisional intermediate speed position established for the largest amount of change of the speed of the engine with a provisional intermediate speed position established with a smallest amount of change of a speed of an engine, to establish said intermediate speed position.

4. The shift control apparatus according to claim 3, wherein the provisional intermediate speed position that permits the automatic transmission to be more rapidly shifted to the target speed position is determined as the intermediate speed position.

5. A shift control apparatus for controlling an automatic transmission having a plurality of speed positions having respective different speed ratios and established by selectively engaging a plurality of frictional coupling devices, such that a shifting control to shift the automatic transmission to a target speed position according to a first shifting-action decision is switched to a shifting control to shift the automatic transmission to a target speed position according to a second shifting-action decision made during the shifting control according to the first shifting-action decision, said shift control apparatus, comprising:

shift control means operable, when it is impossible to shift the automatic transmission directly to the target speed position according to said second shifting-action decision, for determining, as an intermediate speed position of the automatic transmission, one of the speed positions to which the automatic transmission can be shifted directly at a moment of said second shifting-action decision, and effecting the shifting control to shift the automatic transmission to the target speed position according to said second shifting-action decision after establishing said intermediate speed position, wherein the shift control means determines, as said intermediate speed position, one of said speed positions of the automatic transmission that can be directly established at the moment of said second shifting-action decision, which one speed position is established in a shortest time.

6. The shift control apparatus according to claim 5, further comprising:

shift-pattern memory means for storing a plurality of shift patterns of the automatic transmission and shifting times of said plurality of shift patterns; and selecting means, operable when there are a plurality of combinations of said shift patterns which permit a shifting action of the automatic transmission from said intermediate speed position to the target speed position according to said second shifting-action decision, for obtaining total shifting times of said plurality of combinations of the shift patterns on the basis of said shifting times stored in said shift-pattern memory means, and selecting one of the combinations the total shifting time of which is the shortest, wherein said shift control means effects the shifting control to shift the automatic transmission from said intermediate speed position to said target speed position according to the combination of the shift patterns selected by said selecting means.

7. A shift control apparatus for controlling an automatic transmission having a plurality of speed positions having respective different speed ratios and established by selectively engaging a plurality of frictional coupling devices, such that a shifting control to shift the automatic transmission to a target speed position according to a first shifting-action decision is switched to a shifting control to shift the automatic transmission to a target speed position according to a second shifting-action decision made during the shifting control according to the first shifting-action decision, said shift control apparatus, comprising:

shift control means operable, when it is impossible to shift the automatic transmission directly to the target speed position according to said second shifting-action decision, for determining, as an intermediate speed position of the automatic transmission, one of the speed positions to which the automatic transmission can be shifted directly at a moment of said second shifting-action decision, and effecting the shifting control to shift the automatic transmission to the target speed position according to said second shifting-action decision after establishing said intermediate speed position, wherein the shift control means determines, as said intermediate speed position, one of said speed positions of the automatic transmission that can be directly established at the moment of said second shifting-action decision, which one speed position is established with a smallest amount of change of a speed of an engine in a direction to establish said intermediate speed position.

8. The shift control apparatus according to claim 7, further comprising:

shift-pattern memory means for storing a plurality of shift patterns of the automatic transmission and shifting times of said plurality of shift patterns; and selecting means, operable when there are a plurality of combinations of said shift patterns which permit a shifting action of the automatic transmission from said intermediate speed position to the target speed position according to said second shifting-action decision, for obtaining total shifting times of said plurality of combinations of the shift patterns on the basis of said shifting times stored in said shift-pattern memory means, and selecting one of the combinations the total shifting time of which is the shortest, wherein said shift control means effects the shifting control to shift the automatic transmission from said intermediate speed position to said target speed position according to the combination of the shift patterns selected by said selecting means.

* * * * *